UNITED STATES PATENT OFFICE.

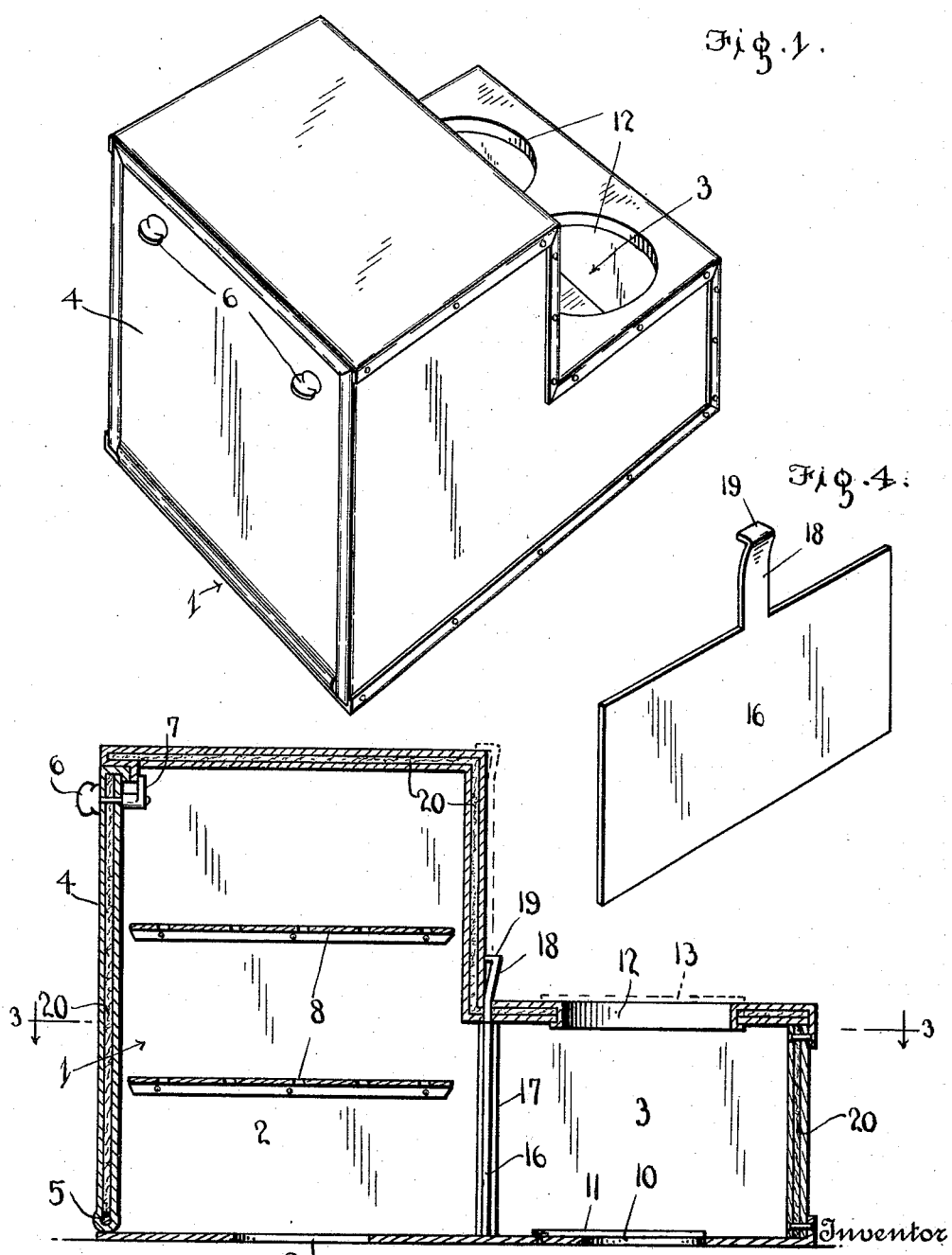

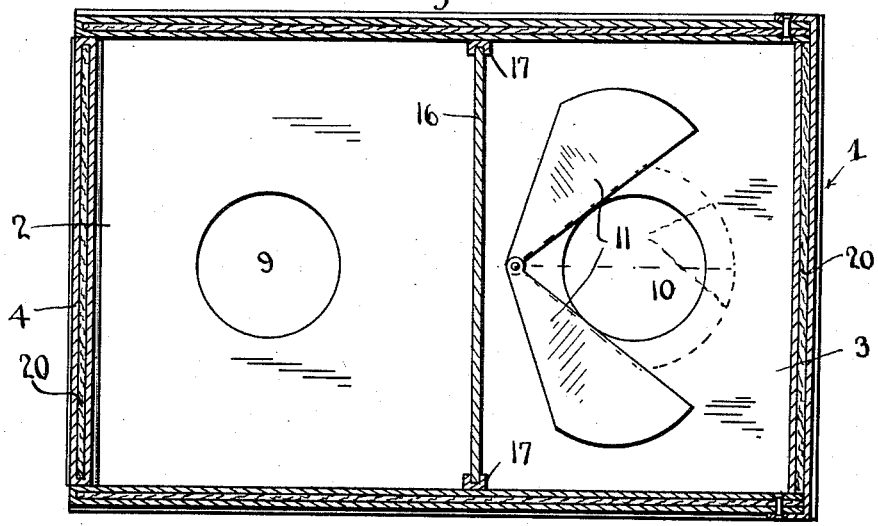

LESTER ROGERS DAVIS, OF RIVERSIDE, CALIFORNIA.

BAKING-OVEN.

1,018,883. Specification of Letters Patent. Patented Feb. 27, 1912.

Application filed May 25, 1911. Serial No. 629,333.

*To all whom it may concern:*

Be it known that I, LESTER ROGERS DAVIS, a citizen of the United States, residing at Riverside, in the county of Riverside and State of California, have invented certain new and useful Improvements in Baking-Ovens; and I do declare the following to be a full, clear, and exact description of the invention, such as will enable others skilled in the art to which it appertains to make and use the same.

This invention relates to a portable oven for use in connection with stoves of varying kinds and by the use of which an additional cooking area is provided.

The object of the invention is to provide a simply constructed and efficient oven of this character having means whereby it may be used in connection with either a double or a single burner, and means whereby baking, boiling, steaming or other cooking may be performed simultaneously with a great economy in fuel.

With this and other objects in view, the invention consists of certain novel features of construction, and the combination and arrangement of parts as will be more fully described and claimed.

In the accompanying drawings:—Figure 1 represents a perspective view of an oven constructed in accordance with this invention; Fig. 2 represents a longitudinal vertical section thereof; Fig. 3 is a horizontal section taken on the line 3—3 of Fig. 2; Fig. 4 is a detail perspective view of the movable partition or damper arranged between the compartments.

In the form illustrated, an oven 1 is shown composed of two compartments 2 and 3, the compartment 2 being of considerably greater height than the compartment 3 and having a closure 4 at the front end thereof which is preferably hinged at the bottom, as shown at 5, and opens downwardly, suitable catches 6 being provided at the upper edge which engage a depending flange 7 formed on the top of the compartment 2 and spaced slightly inward from the outer edge thereof. This flange 7 also forms a stop for limiting the inward movement of the door. This compartment 2 is provided with the usual racks, as 8, for supporting the pans containing the bread and other articles to be baked and any desired number of these racks may be employed. The bottom of the compartment 2 is provided with a burner opening 9 such as is ordinarily used in all ovens of this character and which is adapted to be placed over a burner which supplies the heat to the oven. The compartment 3 which is arranged at the rear of the compartment 2 and is about one-half the height thereof is constructed with a burner opening 10 in the bottom thereof which is adapted to be placed over a second burner when additional heat is required and this burner opening 10 is provided with a pivotal closure or damper 11 which is adapted to be closed when one burner only is to be used for supplying heat to the oven. The top of this compartment 3 is provided with one or more pot holes, as 12, which may be provided with lids as 13, and which are adapted to receive the pots or pans containing articles to be boiled or stewed.

Between the compartments 2 and 3, a movable partition 16 is shown which is preferably constructed to move vertically, the side edges thereof operating in suitable guides 17 formed on the inner side walls of the oven 1. This partition 16 is preferably provided with an extension or handle 18 which projects upwardly from the top edge thereof through a slot formed in the top of the compartment 3 and the free end of this handle 18 is provided with a suitable catch 19 which is adapted to be hooked over the top of the compartment 2 for holding the partition in elevated position, as shown in dotted lines in Fig. 2, and which is so disposed when it is desired to throw the two compartments into one to permit the heat supply of one burner to circulate freely through both compartments. When it is desired to use the compartment 2 only, the partition 16 is lowered into the position shown in full lines in Fig. 2 whereby communication between the two compartments is cut off.

This oven may be constructed of any suitable material being preferably composed of inner and outer sheet metal casings having one or more layers of asbestos 20 arranged between them to prevent the loss of heat by radiation.

It will be obvious from the above description that this oven may be used over one or more burners and food may be baked, boiled, steamed, or stewed with the heat supplied from a single burner and it provides for the retention of all the heat in one burner compartment or permits it to circulate through both compartments and this arrangement greatly economizes the amount of fuel consumed.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

I claim as my invention:—

1. A portable oven comprising two compartments each having a burner opening in the bottom thereof, one of them having pot openings in its top, a vertically movable partition arranged between said compartments and provided with an upwardly extending arm having a hook at its free end for engagement with the other compartment to hold said partition in elevated position.

2. A portable oven comprising two compartments, one of which is higher than the other and each provided with a burner opening in the bottom thereof, the lower compartment having pot holes in its top and the higher compartment provided with a suitable closure at its front, a vertically movable partition arranged between said compartments and having an arm extending upwardly from its upper edge provided at its free end with a catch for engagement with the top of the higher compartment to hold said partition in elevated position.

In testimony whereof I have hereunto set my hand in presence of two subscribing witnesses.

LESTER ROGERS DAVIS.

Witnesses:
P. T. NOBLE,
C. E. SMITH.

---

Copies of this patent may be obtained for five cents each, by addressing the "Commissioner of Patents, Washington, D. C."